United States Patent
Ou

(10) Patent No.: US 8,198,838 B2
(45) Date of Patent: Jun. 12, 2012

(54) CIRCUIT FOR CONTROLLING ROTATION SPEED OF COMPUTER FAN

(75) Inventor: Guang-Feng Ou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 370 days.

(21) Appl. No.: 12/625,572

(22) Filed: Nov. 25, 2009

(65) Prior Publication Data

US 2011/0084632 A1 Apr. 14, 2011

(30) Foreign Application Priority Data

Oct. 12, 2009 (CN) .......................... 2009 1 0308212

(51) Int. Cl.
*H02P 7/28* (2006.01)
*H02P 7/29* (2006.01)
*G05D 23/20* (2006.01)

(52) U.S. Cl. ......... 318/268; 318/472; 388/811; 388/825

(58) Field of Classification Search ................... 318/268, 318/472; 388/811, 825
See application file for complete search history.

(56) References Cited

U.S. PATENT DOCUMENTS

| 7,742,688 | B2 * | 6/2010 | Zou et al. ........... 388/811 |
| 7,983,539 | B2 * | 7/2011 | Pan ................. 388/811 |
| 2009/0162039 | A1 * | 6/2009 | Zou et al. ........... 388/811 |
| 2011/0037424 | A1 * | 2/2011 | Pan ................. 318/472 |

* cited by examiner

*Primary Examiner* — Paul Ip
(74) *Attorney, Agent, or Firm* — Altis Law Group, Inc.

(57) ABSTRACT

A circuit for controlling a rotation speed of a computer fan includes a control chip, a conversion circuit, a fan header, a first switch, and a second switch. When a first terminal of the first switch is connected to a second terminal of the first switch, and a first terminal of the second switch is connected to a second terminal of the second switch, the conversion circuit converts a control signal received from the control chip to a voltage signal, and outputs the voltage signal to a power pin of the fan header. When the first terminal of the first switch is connected to a third terminal of the first switch, and the first terminal of the second switch is connected to a third terminal of the second switch, a control pin of the fan header receives the control signal, the power pin receives power from a first power supply.

9 Claims, 2 Drawing Sheets

CIRCUIT FOR CONTROLLING ROTATION SPEED OF COMPUTER FAN

BACKGROUND

1. Technical Field

The present disclosure relates to circuits, and in particular, to a circuit for controlling a rotation speed of a computer fan.

2. Description of Related Art

Generally, a computer fan is used to facilitate removal of heat to keep the temperature of a central processing unit (CPU) within a safe temperature range. The computer fan may be a 3-pin fan which can be adjusted by a voltage signal, or a 4-pin fan which can be adjusted by a pulse width modulation (PWM) signal controlled by a super input/output chip of a motherboard mounting the CPU.

However, in a 3-pin fan motherboard, a 3-pin fan is connected to the motherboard by a 3-pin header mounted on the motherboard, and in a 4-pin fan motherboard, a 4-pin fan is connected to the motherboard by a 4-pin fan header mounted on the motherboard. Though the 3-pin fan can be connected to the 4-pin fan motherboard by the 4-pin header, the 3-pin fan cannot be controlled by the 4-pin fan controller because the 3-pin fan does not have the fourth pin and cannot receive the PWM signal. Therefore, the CPU may be damaged because the heat may not be dissipated properly.

DETAILED DESCRIPTION

Figure 1:
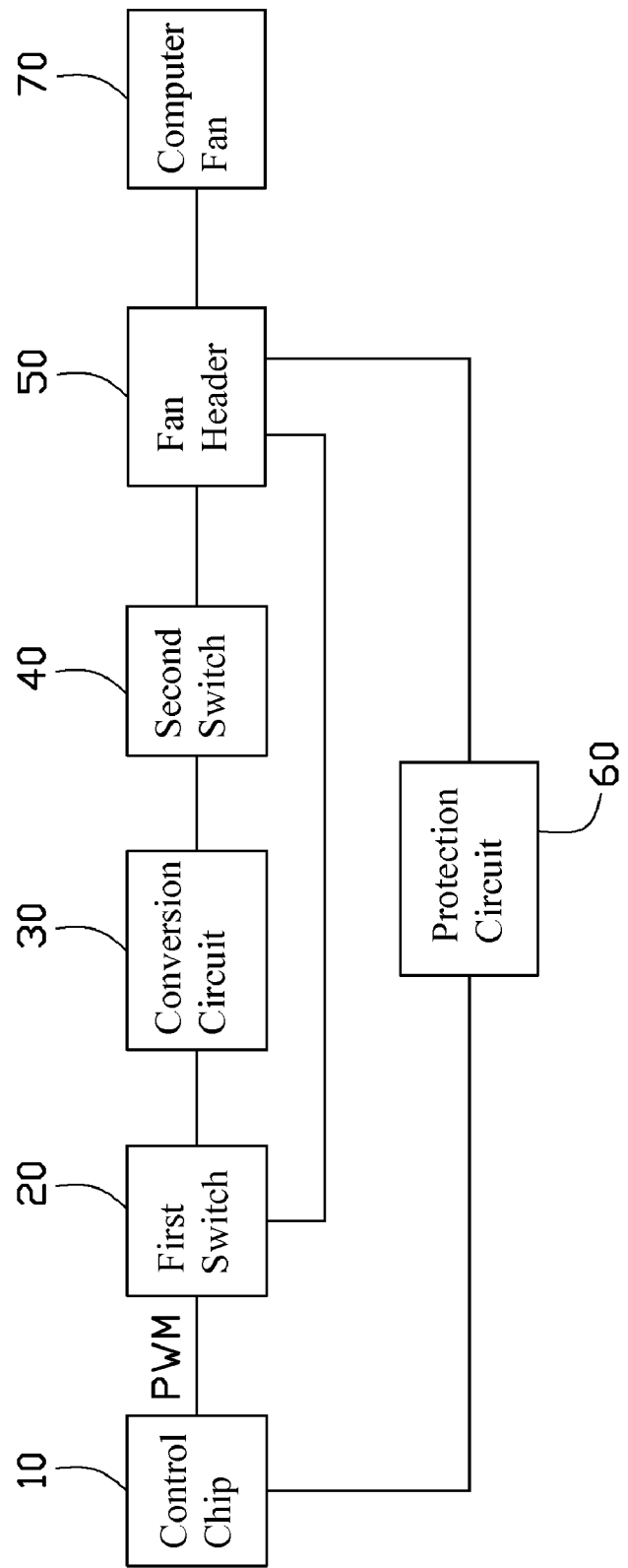
FIG. 1 is a block diagram of an embodiment of a circuit for controlling a rotation speed of a computer fan.

Referring to FIG. 1, an exemplary embodiment of a circuit for controlling a rotation speed of a computer fan 70 includes a control chip 10, a first switch 20, a conversion circuit 30, a second switch 40, a fan header 50, and a protection circuit 60. The conversion circuit 30 is connected to the control chip 10 via the first switch 20, and connected to the fan header 50 via the second switch 40. The fan header 50 is connected to the control chip 10 via the protection circuit 60, and also connected to the first switch 20. Typically, the computer fan 70 is connected to a motherboard (not shown) of a computer by the fan header 50 mounted on the motherboard.

Figure 2:
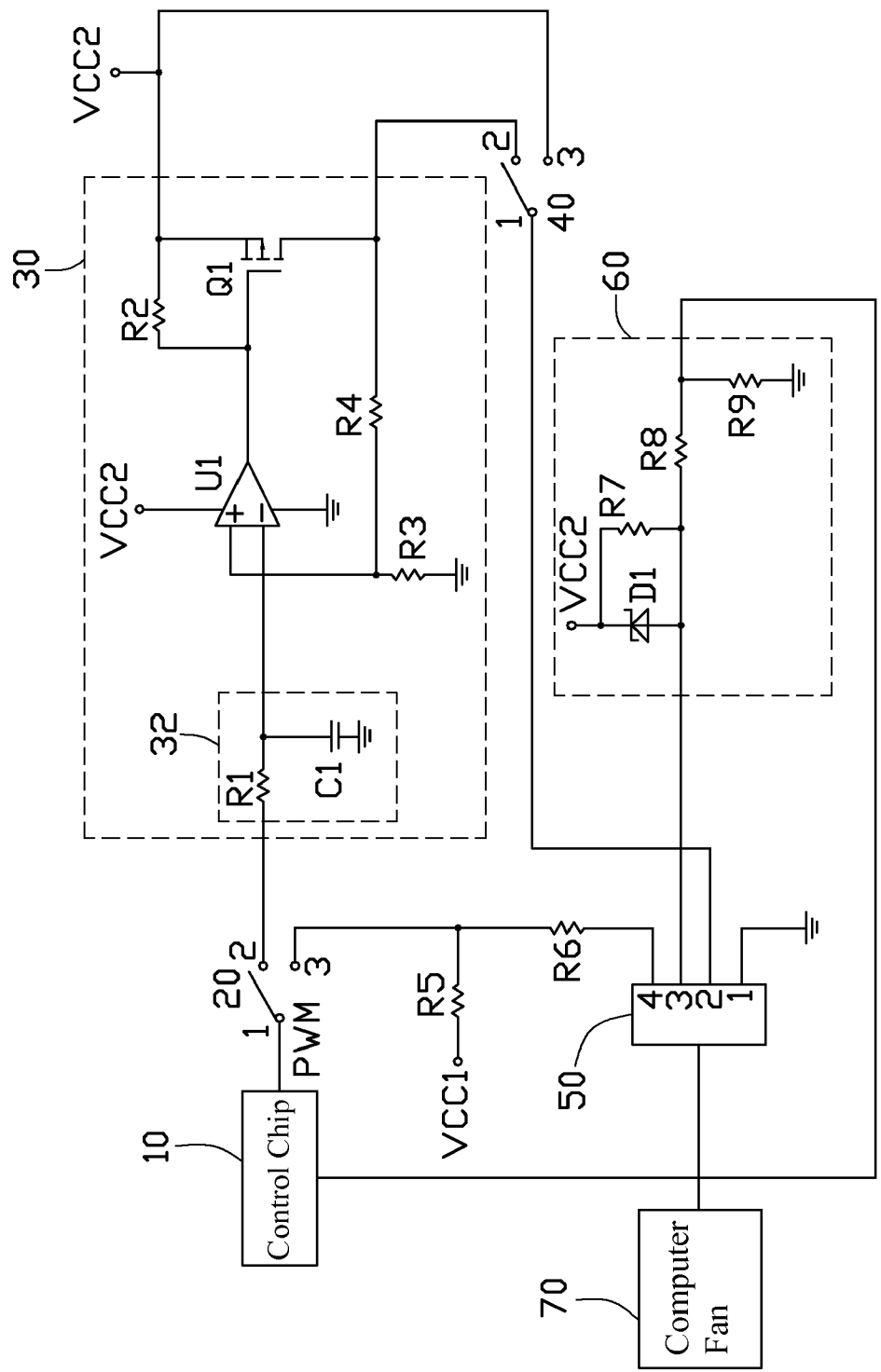
FIG. 2 is a circuit diagram of the circuit of FIG. 1.

Referring to FIG. 2, the conversion circuit 30 includes an integral circuit 32 including a resistor R1 and a capacitor C1, an amplifier U1, and an electric switch Q1. The fan header 50 includes a ground pin 1, a power pin 2, a detection pin 3, and a control pin 4. The protecting circuit 60 includes a diode D1. The first switch 20 includes a first terminal 1 connected to the control chip 10 to receive a pulse width modulation (PWM) signal, a second terminal 2, and a third terminal 3 connected to a first power supply VCC1 via a resistor R5 and connected to the control pin 4 of the fan header 50 via a resistor R6. The second terminal 2 of the first switch 20 is connected to an inverting input terminal of the amplifier U1 via the resistor R1 of the integral circuit 32, a node between the resistor R1 and the inverting input terminal of the amplifier U1 is grounded via the capacitor C1 of the integral circuit 32. A non-inverting input terminal of the amplifier U1 is grounded via a resistor R3. The electric switch Q1 includes a first terminal connected to an output of the amplifier U1 and connected to a second power supply VCC2 via a resistor R2, a second terminal connected to the second power supply VCC2, and a third terminal connected to the non-inverting input terminal of the amplifier U1 via a resistor R4. The second switch 40 includes a first terminal 1 connected to the power pin 2 of the fan header 50, a second terminal 2 connected to the third terminal of the electric switch Q1, and a third terminal 3 connected to the second power supply VCC2. An anode of the diode D1 is connected to the detection pin 3, connected to the second power supply VCC2 via a resistor R7, connected to the control chip 10 via a resistor R8, and grounded via the resistor R8 and a resistor R9 in sequence. A cathode of the diode D1 is connected to the second power supply VCC2.

In one embodiment, the circuit of this disclosure is mounted on the motherboard of the computer. The control chip 10 is a super input/output chip mounted on the motherboard. Each of the first switch 20 and the second switch 40 is a jumper. The electric switch Q1 is a p-channel metal-oxide semiconductor field-effect transistor (PMOSFET), and the first, second, and third terminals of the electric switch Q1 are the gate, the source, and the drain of the PMOSFET respectively. The diode D1 is a zener diode. In other embodiments, the first switch 20, the second switch 40, and the electric switch Q1 may be other switches according to actual need.

If the computer fan 70 connected to the fan header 50 is a 3-pin fan, the control pin 4 of the fan header 50 is idle. The conversion circuit 30 receives the PWM signal from the control chip 10, after the first terminal 1 of the first switch 20 connecting to the second terminal 2 of the first switch 20, and the first terminal 1 of the second switch 40 connecting to the second terminal 2 of the second switch 40. The PWM signal is converted to an analog voltage signal by the integral circuit 32. The analog voltage signal is transmitted to the inverting input terminal of the amplifier U1, and then the amplifier U1 outputs an amplified voltage signal to the first terminal of the electric switch Q1. The electric switch Q1 works in an amplification region. Therefore, if the current of the first terminal of the electric switch Q1 changes, the current change at the third terminal of the electric switch Q1 will change in direct proportion to the current change of the first terminal of the electric switch Q1. Therefore, a corresponding change occurs to the voltage signal at the third terminal of the electric switch Q1. Because the change of the rotation speed of the computer fan 70 is in direct proportion to the change of the voltage signal of the third terminal of the electric switch Q1, the rotation speed of the computer fan 70 is thereby controlled by the PWM signal.

If the computer fan 70 connected to the fan header 50 is a 4-pin fan, the first terminal 1 of the first switch 20 is connected to the third terminal 3 of the first switch 20, and the first terminal 1 of the second switch 40 is connected to the third terminal 3 of the second switch 40. The second power supply VCC2 supplies power to the power pin 2 of the fan header 50, and the PWM signal is transmitted to the control pin 4 of the fan header 50 via the resistor R6, to control the rotation speed of the computer fan 70 thereafter.

When the computer fan 70 works normally, the detection pin 3 of the fan header 50 outputs a detecting signal to the control chip 10 via the protection circuit 60. The control chip 10 detects the actual rotation speed of the computer fan 70 according to the detecting signal, to determine whether the computer fan 70 works normally, and to adjust the rotation speed of the computer fan 70 timely.

The protection circuit 60 employs the diode D1 and uses unidirectional conduction characteristic of the diode D1 to achieve voltage clamping function. When voltage at the anode of the diode D1 excesses a safety range due to unexpected situations, such as short circuit, the diode D1 is turn on, the excess voltage leaks to the second power supply VCC2, so as to prevent the computer fan 70 or the control chip 10 from being damaged. The second power supply VCC2 pulls the voltage level of the detecting signal up to the voltage level of the second power supply VCC2 via the resistor R7, to enhance capability of driving the detecting signal from the fan header 50 to the control chip 10. The voltage of the detecting signal then is divided by the resistors R8 and R9, to satisfy the voltage demand of the control chip 10.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A circuit for controlling a rotation speed of a computer fan, the circuit comprising:
   a control chip to output a control signal;
   a conversion circuit;
   a fan header to mount the computer fan, the fan header comprising a power pin and a control pin;
   a first switch comprising a first terminal connected to the control chip, a second terminal connected to the conversion circuit, and a third terminal connected to the control pin of the fan header; and
   a second switch comprising a first terminal connected to the power pin of the fan header, a second terminal connected to the conversion circuit, and a third terminal connected to a first power supply;
   wherein in response to the first terminal of the first switch being connected to the second terminal of the first switch, and the first terminal of the second switch being connected to the second terminal of the second switch, the conversion circuit receives the control signal from the control chip, converts the control signal to a voltage signal, and outputs the voltage signal to the power pin of the fan header; and
   wherein in response to the first terminal of the first switch being connected to the third terminal of the first switch, and the first terminal of the second switch being connected to the third terminal of the second switch, the control pin of the fan header receives the control signal from the control chip, the power pin receives power from the first power supply.

2. The circuit of claim 1, wherein the conversion circuit comprises:
   an integrated circuit comprising an input terminal connected to the second terminal of the first switch, and an output terminal to output an analog voltage signal;
   an amplifier comprising a non-inverting input terminal grounded via a first resistor, an inverting input terminal connected to the output terminal of the integrated circuit, and an output terminal; and
   an electric switch comprising a first terminal connected to the output terminal of the amplifier, a second terminal connected to the first terminal of the electric switch via a second resistor and connected to the first power supply, and a third terminal connected to the non-inverting input terminal of the amplifier via a third resistor and connected to the second terminal of the second switch;
   wherein in response to the first terminal of the first switch being connected to the second terminal of the first switch, and the first terminal of the second switch being connected to the second terminal of the second switch, the integrated circuit converts the control signal to the analog voltage signal, the amplifier amplifies the analog voltage signal, and outputs an amplified voltage signal to the electric switch, and the third terminal of the electric switch outputs the voltage signal.

3. The circuit of claim 2, wherein the integrated circuit comprises a fourth resistor and a capacitor connected in series between the second terminal of the first switch and ground, and a node between the fourth resistor and the capacitor acts as the output terminal of the integrated circuit.

4. The circuit of claim 2, wherein the electric switch is a p-channel metal-oxide semiconductor field-effect transistor, and the first, second, and third terminals of the electric switch are a gate, a source, and a drain, respectively.

5. The circuit of claim 1, wherein the fan header further comprises a ground pin, and a detection pin connected to the control chip via a protection circuit, to output a detecting signal indicating an actual rotation speed of the computer fan to the control chip.

6. The circuit of claim 5, wherein the protection circuit comprises a diode, an anode of the diode is connected to the detection pin of the fan header, connected to the first power supply via a first resistor, connected to the control chip via a second resistor, and grounded via the second resistor and a third resistor in series, a cathode of the diode is connected to the first power supply.

7. The circuit of claim 6, wherein the diode is a zener diode.

8. The circuit of claim 1, wherein the control chip is a super input/output chip, and the control signal is a pulse width modulation signal.

9. The circuit of claim 1, wherein each of the first switch and the second switch is a jumper.

* * * * *